Aug. 16, 1932.   P. REHLÄNDER   1,872,501

OPTICAL SYSTEM FOR COLOR PHOTOGRAPHY

Filed Nov. 19, 1930

Inventor:
Paul Rehländer
by
Paul Rutland
Attorney

Patented Aug. 16, 1932

1,872,501

UNITED STATES PATENT OFFICE

PAUL REHLÄNDER, OF BERLIN-CHARLOTTENBURG, GERMANY

OPTICAL SYSTEM FOR COLOR PHOTOGRAPHY

Application filed November 19, 1930, Serial No. 496,804, and in Germany November 19, 1929.

This invention relates to the photographic color process, which is known as the Berthon process. In this process natural colors will be obtained, when exactly the same optical system is used in taking and in reproducing. When the taking and the reproducing optic is not exactly the same, the color in the reproduced image is falsified in a great many points.

C. W. Frederick in his Patents Nos. 1,685,600 and 1,749,278 has given optical ways to avoid this fault.

My invention gives a new way to get natural color in all points of the reproduced image, in case that the Berthon process is perfected by minute cylindrical lenses on the back of the photographic film and the corresponding color diaphragm in the objectives.

I take a system of prisms, the reflecting edges of which are parallel to the direction of the minute cylindrical lenses. This system of prisms is placed as near as possible to the surface of the minute cylindrical lenses of the photographic film. The angle of inclination to the plane of the film layer is greater at the extreme edges of the image than in the middle of it. The reflecting planes of these prisms are more inclined to the plane of the film layer at the sides of the image than in the middle of it.

I can also take instead of this system of prisms a cylindrical lens, which may be viewed as a union of a great many prisms.

C. W. Frederick took a spherical lens for this purpose (Patent No. 1,749,278, Fig. 1 and Fig. 3, L). This spherical lens is, in the case of minute cylindrical lenses, a correcting means not only for the fault effected by the minute cylindrical lenses in the direction perpendicular to the axis of these lenses, but also in the direction parallel to this axis. But in this latter direction the minute cylindrical lenses do not at all deteriorate the image and therefore the correction of the spherical lens is in the direction parallel to the axis of the minute cylindrical lenses a surplus-correction, i. e. a deterioration of the image.

Figure 1:
Fig. 1 is a section through the lenticular film with one form of my correcting unit.
Figure 2:
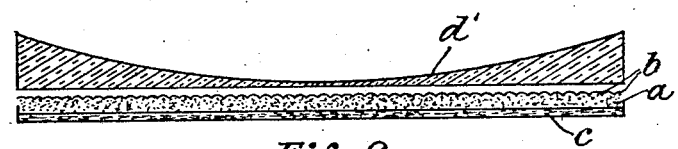
Figs. 2 to 4 are similar sections of other forms of the invention.
Figure 3:
Figure 4:
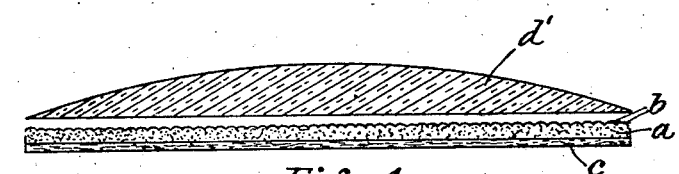

In Figs. 1, 2, 3 and 4 $a$ is the film support with the minute cylindrical lenses $b$; $c$ is the panchromatic emulsion. In Figs. 1 and 3 $d$ are the prisms, the reflecting edges of which are parallel to the axis of the minute cylindrical lenses. The reflecting planes of the prisms are more inclined to the film layer at the sides of the image than in the middle of it. In Figs. 2 and 4 $d$ are the cylindrical lenses; the central axis of the minute cylindrical lenses on the surface of the film and the central axis of the cylindrical lenses $d$ in Fig. 2 and Fig. 4 are parallel.

Furthermore I take a sliding frame with several cylindrical lenses of different focus, so that the projectionist in the cinema theater and the copying man in the process of taking a copy can easily find the lens, which corrects best the false colors.

Figure 5:
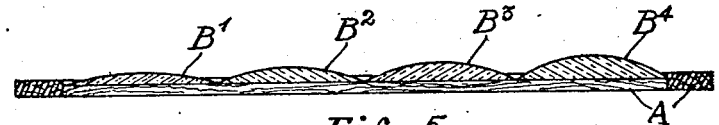
Fig. 5 is a section through a sliding frame carrying correcting lenses of different curvature.
Figure 6:
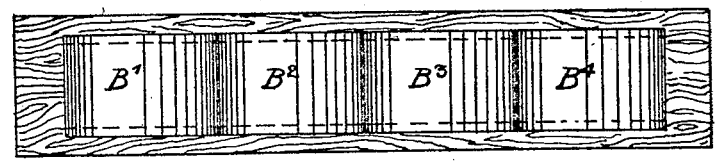
Fig. 6 is a plan view of the frame of Fig. 5.

In Fig. 5 and Fig. 6 A is the frame and $B_1$, $B_2$, $B_3$, $B_4$ are the lenses of different radius of curvature. Instead of these lenses I can take the systems of prisms described above.

This frame is applicable for the projection in the cinema theaters and also in the process by which photographical copies are gained of the image firstly taken from the nature.

Wherever in the claims I make use of the term "lens" I wish to include any optical element, so constructed that the refracting angle increases or decreases from its central line to its edges.

Having thus described my invention, I claim as new and desire to have secured by Letters Patent:

1. In the Berthon process with numerous minute cylindrical lenses the placing of a cylindrical lens in a fixed distance of the objective and as near the minute cylindrical lenses of the film as mechanically possible, the central axis of this cylindrical lens being parallel to the central axis of the minute cylindrical lenses of the film.

2. In the Berthon process with numerous minute cylindrical lenses the placing of a sliding frame with several lenses of different focus as described in the claim 1.

In testimony whereof I affix my signature.

PAUL REHLÄNDER.